US007726519B2

(12) United States Patent
Heldt et al.

(10) Patent No.: US 7,726,519 B2
(45) Date of Patent: Jun. 1, 2010

(54) FLUID DISPENSER DEVICE

(75) Inventors: Frédéric Heldt, Louviers (FR); Matthieu Savalle, Rouen (FR)

(73) Assignee: Valois S.A.S., Le Neubourg (FR)

( * ) Notice: Subject to any disclaimer, the term of this patent is extended or adjusted under 35 U.S.C. 154(b) by 893 days.

(21) Appl. No.: 10/536,350

(22) PCT Filed: Nov. 24, 2003

(86) PCT No.: PCT/FR03/03466

§ 371 (c)(1),
(2), (4) Date: May 26, 2005

(87) PCT Pub. No.: WO2004/050508

PCT Pub. Date: Jun. 17, 2004

(65) Prior Publication Data

US 2005/0284890 A1 Dec. 29, 2005

(30) Foreign Application Priority Data

Nov. 29, 2002 (FR) .................................. 02 15047

(51) Int. Cl.
*G01F 11/06* (2006.01)

(52) U.S. Cl. .................... 222/153.13; 222/81; 222/319; 222/326; 222/381; 222/509

(58) Field of Classification Search ............ 222/153.13, 222/153.14, 81, 82, 319, 372, 381, 386, 391, 222/153.01, 88, 326, 505, 509, 325, 327, 222/402
See application file for complete search history.

(56) References Cited

U.S. PATENT DOCUMENTS

| | | | | |
|---|---|---|---|---|
| 5,046,642 | A * | 9/1991 | Cathcart et al. | 222/153.09 |
| 5,108,011 | A * | 4/1992 | Kobayashi et al. | 222/153.13 |
| 5,169,039 | A * | 12/1992 | Kay et al. | 222/509 |
| 6,401,987 | B1 | 6/2002 | Oechsel et al. | |
| 6,772,915 | B2 * | 8/2004 | Helmlinger | 222/153.13 |

FOREIGN PATENT DOCUMENTS

| | | | |
|---|---|---|---|
| DE | 35 12 6650 | A | 10/1986 |
| DE | 295 07 296 | U | 6/1995 |
| DE | 199 63 218 | A | 7/2001 |

* cited by examiner

*Primary Examiner*—J. Casimer Jacyna
(74) *Attorney, Agent, or Firm*—Sughrue Mion, PLLC

(57) ABSTRACT

A fluid dispenser device, comprising: a dispenser orifice (5); a reservoir (10) containing at least one dose of fluid; at least one piston (15) axially slidable in said reservoir (10) so as to dispense said fluid; a dispenser member (20) co-operating with said piston (15); and an actuator element (30) co-operating with said dispenser member (20); said device being characterized in that said dispenser member (20) is displaceable between a blocking position, preventing said actuator element (30) from being actuated, and a release position in which the actuation of said actuator element (30) displaces said dispenser member (20) so as to dispense a dose of fluid, said dispenser member (20) being displaced manually from its blocking position to its release position before said device is actuated.

10 Claims, 2 Drawing Sheets

FLUID DISPENSER DEVICE

FIELD OF INVENTION

The present invention relates to a fluid dispenser device, and more particularly to such a device including means for preventing it from being actuated in accidental or undesired manner before it has been used for the first time.

BACKGROUND

Systems for preventing a fluid dispenser device from being accidentally actuated, e.g. while it is being transported or stored, are well known in the prior art. Their purpose is to guarantee that when the user decides to actuate the device for the first time, all the fluid is contained inside the device, and to guarantee that no fluid has been dispensed, and that no loss of sealing occurred while the device was being stored or transported. Such systems can be of various types. Thus, pull-off-strip systems are known in which a strip of pull-off material is disposed on or around the device, said device not being actuatable so long as said strip has not been pulled off. Such systems are relatively complex to manufacture and to assemble, and therefore increase the cost of manufacturing and assembling the device correspondingly. This is particularly disadvantageous when the device is disposable. Another type of system includes elements such as tabs that the user must displace before being able to use the device. Once again, an additional blocking part is required, thereby implying an increase in the cost of manufacturing and assembling the device.

CERTAIN OBJECTS OF INVENTION

An object of the present invention is to provide a fluid dispenser device that does not have the above-mentioned drawbacks. In particular, an object of the present invention is to provide a fluid dispenser device that cannot be actuated in accidental or undesired manner before it has been actuated by the user for the first time, and that does not require the use of an additional part designed for this purpose. The present invention is also childproof, preventing the device from being actuated by a child.

Another object of the present invention is to provide such a device that is simple and inexpensive to manufacture and to assemble, while being particularly safe and reliable in use.

The present invention therefore provides a fluid dispenser device, comprising: a dispenser orifice; a reservoir containing at least one dose of fluid; at least one piston axially slidable in said reservoir so as to dispense said fluid; a dispenser member co-operating with said piston; and an actuator element co-operating with said dispenser member; said dispenser member being displaceable between a blocking position, preventing said actuator element from being actuated, and a release position in which the actuation of said actuator element displaces said dispenser member so as to dispense a dose of fluid, said dispenser member being displaced manually from its blocking position to its release position before said device is actuated.

Preferably, said dispenser member is axially displaceable, and said actuator element is a lateral actuator element that is displaced in a direction that is approximately perpendicular to the axial displacement direction of said dispenser member.

Advantageously, said dispenser member slides axially between said blocking position in which it is disposed remote from said piston, and said release position in which it is disposed in contact with said piston.

Advantageously, said device includes a body including said dispenser orifice at one end, and a bottom wall at the other end, said dispenser member projecting from said bottom wall when in the blocking position.

Advantageously, said dispenser member includes at least one engagement means co-operating with said actuator element while it is being actuated.

Advantageously, said dispenser member includes two axially offset engagement means, the first engagement means co-operating with the actuator element so as to dispense a first dose of fluid, and the second engagement means co-operating with the actuator element so as to dispense a second dose of fluid.

Advantageously, one engagement means includes a projection co-operating with a cam surface of said actuator element.

Advantageously, when the dispenser member is in the blocking position, said at least one engagement means co-operates with the actuator element so as to prevent it from being actuated.

BRIEF DESCRIPTION OF THE DRAWINGS

Other characteristics and advantages of the present invention appear more clearly from the following detailed description of a particular embodiment thereof, given by way of non-limiting example and with reference to the accompanying drawings, in which.

DETAILED DESCRIPTION OF CERTAIN EMBODIMENTS OF INVENTION

Figure 1:
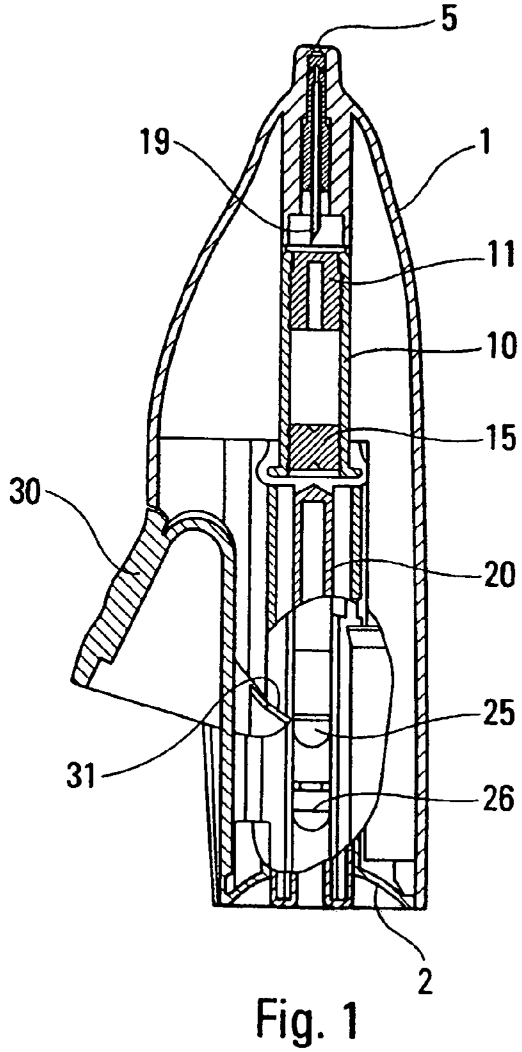
FIG. 1 is a diagrammatic section view of a fluid dispenser device constituting an advantageous embodiment of the present invention, in the blocking position.

With reference to the figures, a fluid dispenser device of the invention generally comprises a body 1 incorporating a dispenser orifice 5. A fluid reservoir 10 is disposed in said body and is connected to said dispenser orifice 5. The term “fluid” refers to any type of liquid, gas, paste, or powder, depending on the desired use of the device. The invention applies more particularly to “single-dose” or “double-dose” devices in which the reservoir contains one dose or two half doses of fluid. In this type of device, a piston 15 slides axially in said reservoir 10, so as to dispense said dose(s) of fluid in one or two actuations of the device. In order to displace the piston 15 inside the reservoir 10, a dispenser member 20 is provided that co-operates with said piston 15, said dispenser member 20 itself being displaced by means of an actuator element 30 that the user actuates. Thus, in order to dispense a dose of fluid, the user displaces the actuator element 30, thereby displacing the dispenser member 20 which, by co-operating with the piston 15, displaces said piston inside the reservoir 10, thereby causing a dose of fluid to be expelled through the dispenser orifice 5.

In the example shown, the reservoir 10 is formed by a hollow tube closed at one end by the piston 15, and at the other end by a leaktight plug 11, an opening system being provided for opening said plug, said opening system possibly comprising a needle 19 that comes to pierce the plug while the device is being actuated for the first time. In the example shown, the needle 19 is secured relative to the body 1 and to the dispenser orifice 5, and, under the effect of the pressure created inside the reservoir 10 by the displacement of the piston 15, it is the plug 11 that is displaced towards the needle so as to be pierced by said needle. Naturally, the present invention is not limited to a device such as that shown in the drawings, which device represents only one advantageous embodiment to which the present invention applies.

Figure 2:
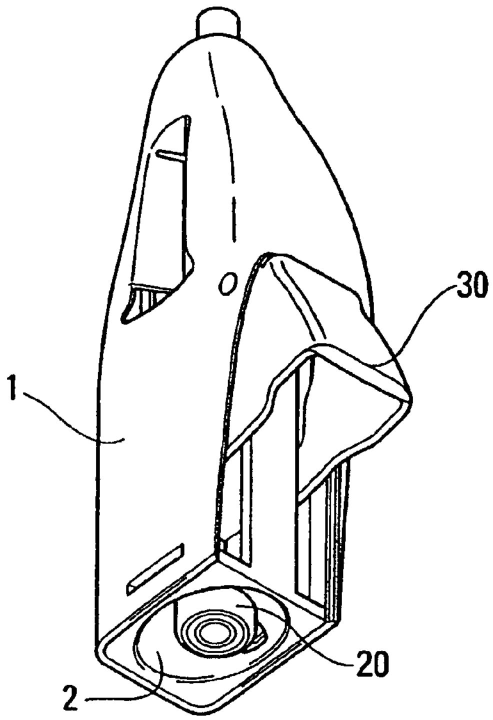
FIG. 2 is a diagrammatic perspective view of the FIG. 1 device.
Figure 3:
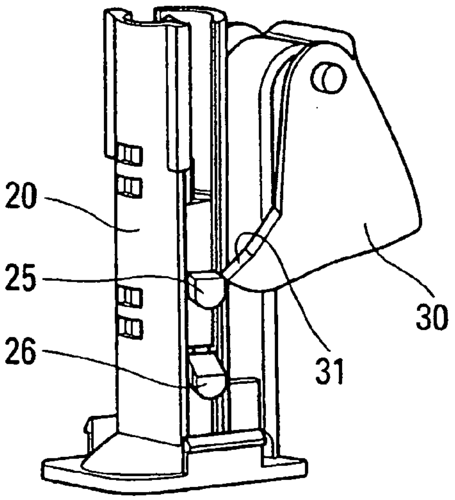
FIG. 3 is a diagrammatic and fragmentary perspective view of a portion of the FIG. 1 device, showing the blocking position.
Figure 4:
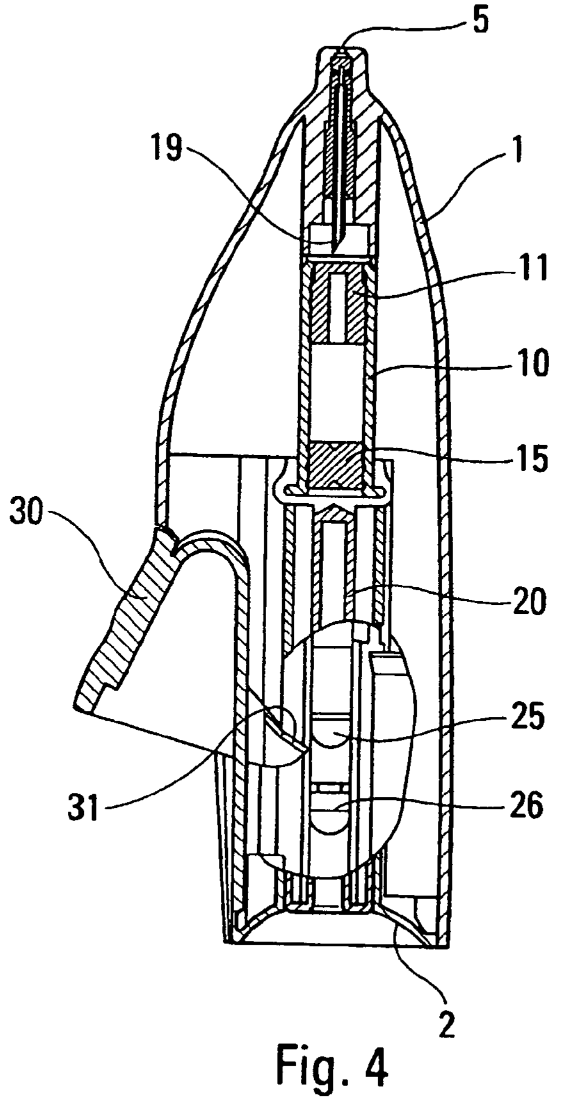
FIG. 4 is a view similar to FIG. 1, in the release position, i.e. in a position in which the user can actuate the device.
Figure 5:
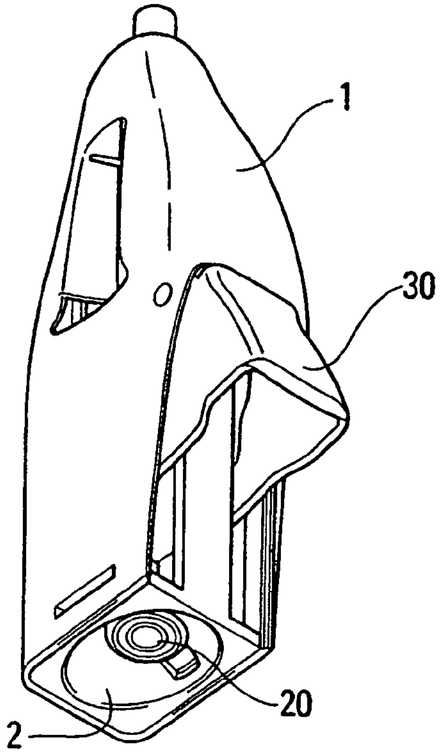
FIG. 5 is a view similar to FIG. 2, in the release position.
Figure 6:
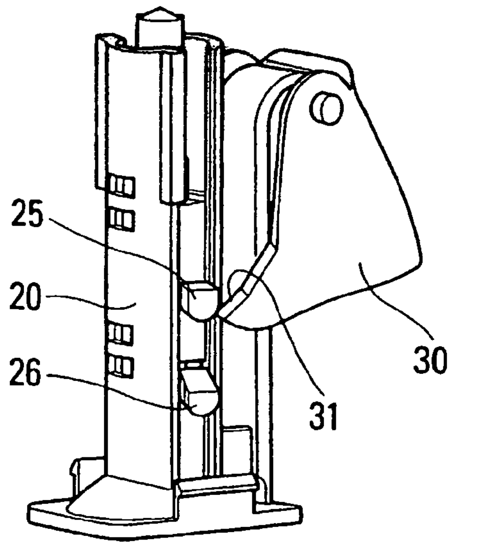
FIG. 6 is a view similar to FIG. 3, showing the release position in greater detail.

In the invention, in order to avoid any risk of actuation that is accidental or undesired, e.g. during transport, the dispenser member 20 is displaceable between a blocking position, shown in FIGS. 1 to 3, and a release position shown in FIGS. 4 to 6. In the blocking position, the dispenser member 20 prevents the actuator element 30 from being displaced, and therefore from being actuated. It is the user who manually displaces the dispenser member 20 from its blocking position to its release position before the device is actuated. Thus, any risk of the device being actuated in undesired manner is prevented by the blocking position of the dispenser member, and when the user wishes to use the device, said user manually displaces the dispenser member towards its release position, thereby enabling the device to be actuated. The present invention therefore makes it possible to provide blocking means for preventing the device from being actuated, which blocking means require no additional parts, since it is the dispenser member 20 itself that serves as the blocking element. The present invention therefore makes it possible to eliminate one or more parts when making a blocking system, thereby presenting advantages in terms of the cost of manufacturing and assembling the device. This is particularly important when the device of the invention is of the disposable type.

As shown in the drawings, the dispenser member 20 is preferably axially displaceable, i.e. displaceable in the same direction as the displacement of the piston 15 inside the reservoir 10, whereas the actuator element 30 is a lateral actuator element which is displaced in a direction that is approximately perpendicular to the axial displacement direction of said dispenser member 20. The present invention therefore makes it possible to provide an astute and low-cost blocking system for a device that is suitable for including a lateral actuator element.

Advantageously, the dispenser member 20 is mounted to slide axially between its blocking position and its release position, said dispenser member 20 being disposed remote from the piston 15 in the blocking position, as can be seen in FIG. 1, and coming into contact with said piston 15 when it is displaced towards its release position, as can be seen in FIG. 4. This embodiment provides additional safety, since it prevents any risk of the piston 15 being accidentally displaced, e.g. during transport, even if said dispenser member 20 needs to be displaced a little from its blocking position.

In advantageous manner, the body 1 can include a bottom wall 2 at its end remote from the dispenser orifice 5, said bottom wall having an opening through which one end of said dispenser member 20 projects when in the blocking position. This can be seen more particularly in FIGS. 1 and 2. Thus, when the user wishes to use the device, said user takes hold of the body 1, and using a finger, or preferably a thumb, exerts axial pressure on the projecting portion of the dispenser member 20 which projects from the bottom wall 2, thereby causing said dispenser member 20 to be displaced towards its release position. The release position is achieved when the dispenser member 20 no longer projects from said bottom wall of the body 1, as can be seen in FIG. 5. This embodiment ensures, in particular, that it is impossible to displace the dispenser member beyond its release position, which might lead to undesired displacement of the piston 15 in the reservoir, and therefore to some of the fluid being dispensed. Once the end of the dispenser member 20 no longer projects from the bottom wall 2, the user can move the dispenser member 20 no farther, and this risk is therefore eliminated.

In the embodiment shown in FIG. 1, the dispenser member 20 advantageously includes at least one engagement means 25, 26 which co-operates with said lateral actuator element 30 while it is being actuated. With a single-dose dispenser, i.e. when all the fluid must be dispensed in a single actuation, the dispenser member includes only one engagement means 25. However, with a double-dose dispenser, as shown in the figures, the contents of the reservoir 10 must be divided into two doses that are dispensed successively during two successive actuations of the device. In this event, the dispenser member preferably includes two axially offset engagement means 25 and 26, the first engagement means 25 co-operating with the actuator element 30 so as to dispense the first dose of fluid, and the second engagement means 26 co-operating with the actuator element 30 so as to dispense the second dose of fluid. With reference more particularly to the embodiment shown in the figures, each engagement means can include a projection which co-operates with a cam surface 31 of said actuator element 30. Thus, the actuator element 30 is pivotally mounted on the body 1, and the cam surface 31 can slide under said projection 25 or 26 into the release position of the dispenser member. Pivoting the lateral actuator element 30 thus causes said dispenser member 20 to be displaced upwards in axial manner so as to dispense one dose of fluid. Advantageously, it is the engagement means that prevent the actuator element 30 from being actuated when the dispenser member 20 is in the blocking position. This can be seen clearly in FIGS. 1 to 3 which show the first engagement means, in this case the projection 25, which co-operates with the end of the cam surface 31 of the lateral actuator element 30 so as to prevent said lateral actuator element from being displaced.

Thus, the present invention advantageously uses the dispenser means of the device to block the actuator element before the device is used for the first time. No additional parts are required, and the various component elements of the actuator system do not need to be modified or made in more complicated manner in order to achieve said blocking. Naturally, the embodiment shown in the figures is not limiting and other engagement means could be envisaged. For example, instead of projections, the dispenser member 20 could include openings into which the cam surface 31 of the lateral actuator element 30 penetrate, so as to cause said dispenser member to be displaced. Naturally, other variants can also be envisaged.

The present invention therefore enables a system to be provided in simple and low-cost manner, with said system being reliable and effective in preventing the device from being actuated in undesired or accidental manner.

The present invention is described above with reference to an advantageous embodiment thereof, but naturally it is not limited to the embodiment described and shown in the drawings, but, on the contrary, the person skilled in the art may apply any modification thereto without going beyond the ambit of the present invention as defined by the accompanying claims.

The invention claimed is:

1. A fluid dispenser device, comprising: a dispenser orifice; a reservoir containing at least one dose of fluid; at least one piston axially slidable in said reservoir so as to dispense said fluid; a dispenser member co-operating with said piston; and an actuator element co-operating with said dispenser member; wherein said dispenser member is displaceable between a blocking position, preventing said actuator element from being actuated, and a release position in which the actuation of said actuator element displaces said dispenser member so as to dispense a dose of fluid, said dispenser member being displaced manually from the blocking position to the release position before said device is actuated; and wherein said dispenser member is axially displaceable towards the piston, and said actuator element is a lateral actuator element that is displaced inwardly in a direction that is approximately perpendicular to the axial displacement direction of said dispenser member;

wherein said dispenser member slides axially between said blocking position in which said dispenser member is disposed remote from said piston, and said release position in which said dispenser member is disposed in contact with said piston.

2. A fluid dispenser device according to claim 1, in which said fluid dispenser device includes a body including said dispenser orifice at one end, and a bottom wall at the other end, said dispenser member projecting from said bottom wall when in the blocking position.

3. A device according to claim 1, in which said dispenser member includes at least one engagement means co-operating with said actuator element while the actuator element is being actuated.

4. A device according to claim 3, in which said at least one engagement means includes a projection co-operating with a cam surface of said actuator element.

5. A device according to claim 3, in which, when the dispenser member is in the blocking position, said at least one engagement means co-operates with the actuator element so as to prevent the actuator element from being actuated.

6. A fluid dispenser device, comprising: a dispenser orifice; a reservoir containing at least one dose of fluid; at least one piston axially slidable in said reservoir so as to dispense said fluid; a dispenser member co-operating with said piston; and an actuator element co-operating with said dispenser member; wherein said dispenser member is displaceable between a blocking position, preventing said actuator element from being actuated, and a release position in which the actuation of said actuator element displaces said dispenser member so as to dispense a dose of fluid, said dispenser member being displaced manually from the blocking position to the release position before said device is actuated; and wherein said dispenser member is axially displaceable towards the piston, and said actuator element is a lateral actuator element that is displaced inwardly in a direction that is approximately perpendicular to the axial displacement direction of said dispenser member;

wherein said dispenser member includes at least one engagement means co-operating with said actuator element while the actuator element is being actuated;

wherein said at least one engagement means includes two axially offset engagement means, a first engagement means co-operating with the actuator element so as to dispense a first dose of fluid, and a second engagement means co-operating with the actuator element so as to dispense a second dose of fluid.

7. A device according to claim 6, in which said at least one engagement means includes a projection co-operating with a cam surface of said actuator element.

8. A device according to claim 6, in which, when the dispenser member is in the blocking position, said at least one engagement means co-operates with the actuator element so as to prevent the actuator element from being actuated.

9. A fluid dispenser device, comprising:

a dispenser orifice;

a reservoir containing at least one dose of fluid;

a piston axially slidable in the reservoir so as to dispense the fluid;

a dispenser member operatively co-operating with the piston so as to slide the piston; and an actuator element operatively co-operating with the dispenser member so as to axially displace the dispensing member; and wherein the dispenser member is displaceable between a blocking position that prevents actuation of the actuator element and a release position in which actuation of the actuator element is permitted to displace the dispenser member so as to dispense a dose of fluid; and wherein the dispenser member is structured to be manually displaced towards the piston from the blocking position to the release position before the device is actuated;

wherein the actuator element is a lateral actuator element that is displaced inwardly in a direction that is approximately perpendicular to the axial displacement direction of the dispenser member; and wherein the dispenser member comprises a protrusion that operatively engages the actuator element so as to block lateral displacement of the actuator element when the dispenser member is in the blocking position and to slide along a cam surface of the actuator element when the dispenser member is in the release position and while the actuator element is being laterally displaced.

10. The fluid dispenser device according to claim 9, wherein the dispenser member is manually displaced from the blocking position to the release position by manually moving the dispenser member in an axial direction.

* * * * *